United States Patent [19]
Jehle et al.

[11] Patent Number: 4,719,468
[45] Date of Patent: Jan. 12, 1988

[54] RADAR SYSTEM WITH REDUCED DISTANCE ERROR

[75] Inventors: Franz Jehle; Jürgen Mutschler, both of Ulm, Fed. Rep. of Germany

[73] Assignee: Licentia Patent-Verwaltungs-GmbH, Fed. Rep. of Germany

[21] Appl. No.: 732,428

[22] Filed: May 9, 1985

[30] Foreign Application Priority Data

May 9, 1984 [DE] Fed. Rep. of Germany ....... 3417073

[51] Int. Cl.$^4$ .............................................. G01S 7/28
[52] U.S. Cl. .................................................. 342/201
[58] Field of Search ............... 343/17.2 PC; 342/201, 342/202, 132, 134

[56] References Cited

U.S. PATENT DOCUMENTS 4,150,378  4/1979  Barton ............................ 342/442 X

OTHER PUBLICATIONS

Temes, "Sidelobe Suppression in a Range-Channel Pulse Compression Radar", IRE Trans. on Mil. Elec., vol. 6, 1962, pp. 162-169.
Cook et al., "A Pulse Compression Predistortion Function for Efficient Sidelobe Reduction in a High Power Radar", IEEE, 52, Apr. 1964, pp. 377-389.
Gerard et al., "The Design and Applications of Highly Dispersive Acoustic Surface Wave Filters", IEEE Trans. vol. su-20, No. 2, Apr. 173, pp. 94-104.

Primary Examiner—T. H. Tubbesing
Assistant Examiner—John B. Sotomayor
Attorney, Agent, or Firm—McGlew and Tuttle

[57] ABSTRACT

In a radar system comprising equipment for transmitting frequency modulated pulses and compressing the received signals in a filter for frequency-dependent weighting, the weighting is asymmetrical in a manner such that the leading sidelobes of the pulse compression signal are reduced and the lagging sidelobes are raised. The reduced leading sidelobes can easily be reduced below an amplitude threshold so that the main echo lobe within the pulse compression signal is reliably acquired for determining the closest target distance. The invention may advantageously be applied to ground tracking radars.

8 Claims, 5 Drawing Figures

PKS' (t)

ω(t)

PKS(t)

RADAR SYSTEM WITH REDUCED DISTANCE ERROR

FIELD AND BACKGROUND OF THE INVENTION

The present invention relates in general to radar and in particular to a new and useful radar system which can be used primarily as ground tracking radar, and which produces a pulse compression signal having asymmetrical sidelobes for reducing distance errors which are caused by symmetrical sidelobes.

Pulse compression methods have already been known in the field or radar, for some time. They are comprhensively described in the publication Modern Radar, John Wiley & Sons, 1967, for example. Pulse compression makes it possible to obtain a higher resolution in distance than would correspond to the length of the transmitted pulse. Developments in this area show a preference for digital techniques, with the transmitted pulse being sub-divided into a plurality of subpulses which are coded in a digital sequence such as a pseudo-random sequence. In a matched-filter type of pulse compression in a radar receiver, an echo pulse reflected by a target is substantially compressed to a pulse which is very short relative to the transmitted and the echo pulse. The degree of compression generally grows better with the number of subpulses. A large number of subpulses, however, is equivalent to a long duration of the transmitted pulse, which is contrary to the use of this technique for measuring very short distances, such as while determining the flying height of aircraft with ground tracking radar.

Analog pulse compression methods known in the radar field and operating with a frequency-modulated transmitted pulse and a compression filter accomplishing a frequency-dependent time lag and weighting, produce relative high time sidelobes associated with the main bode of the compressed target echo signal. Sometimes, these high sidelobes are evaluated instead of the main lobe, which leads to considerable distance measuring errors and, in ground tracking radars, to errors in altitude.

SUMMARY OF THE INVENTION

The present invention is directed to a radar system of the above mentioned kind in which the distance errors mentioned in the foregoing are eliminated.

Accordingly an object of the present invention is to provide a radar system, particularly for ground tracking, comprising equipment for transmitting frequency modulated pulses and for compressing echo pulses by cross-correlating the received signals to a weighting function of a compression filter, the compression filter being provided to produce an asymmetrical weighting function to produce sidelobes on either side of the echo pulses with a sidelobe that leads in time with respect to the echo pulses being reduced with respect to a sidelobe that lags the echo pulses with respect to time.

What is substantial in the present invention is that the compression filter performs its weighting function asymmetrically. Prior art pulse compression methods, with a transmitted frequency modulation (chirp), operate with symmetrically weighted filters and therefore produce a pulse compression signal having symmetric sidelobes. By reducing the sidelobes that are leading in time with respect of the pulse compression signal, which is effected by cross correlation with the weighting function of the compression filter, and simultaneously raising the lagging sidelobes, the level difference (in dB) between the main echo lobe and the sidelobes can substantially be improved without thereby introducing disadvantages as to the signal-to-noise ratio or the width of the compressed pulse. The reduced leading sidelobes may easily be separated by an amplitude threshold. On the lagging sidelobes, no particular requirements are imposed in applications such as to a ground tracking radar where the identification of the nearest target is substantial for maintaining the optimal flight altitude. These lagging sidelobes may therefore protrude beyond the amplitude threshold without unfavourably affecting the function of the radar system.

With predetermined relations in time (reduced leading, and raised lagging sidelobes), providing of the radar system with a weighting function to achieve a desired pulse compression signal belongs to the knowledge of those skilled in the art and may be learned, for example, from the above mentioned publication Modern Radar and the other references cited below which are all incorporated here by reference.

An article entitled "Design of Line-Source Antennas for Narrow Beamwidth and Low Side Lobes", by T. T. Tayler, IRE Transactions on Antennas and Propagation, AP-3, 1955, pp. 16–28 contains a comprehensive description of an approximate method of implementing symmetrical weighting functions, in which the desired weighting function is laid down as a Fourier series and the zero points of the pulse compression signal are assumed in symmetrical positions relative to the main value wherefrom the Fourier coefficients are obtained. This article is incorporated here by reference. The same method may be applied to an asymmetrical weighting function with the leading time sidelobes being reduced in accordance with the invention, if the output signal and the zero points thereof are assumed in a correspondingly assymetric position. For example, by taking a rectangular form with cosinusoidally rounded edges as the weighting function of the transmitted signal, and a Fourier series with still unknown Fourier coefficients as the asymmetric weighting function of the response signal, the output signal can be described by an analytic term in which the Fourier coefficients occur only linearly. The assumed asymmetry of the zero points of the output signal then leads to a system of linear equations wherefrom the Fourier coefficients can be computed in a simple way. In this manner, the weighting function of the filter is determined.

The weighted compression filter is preferably designed as a surface wave filter with a frequency-dependent lag.

To modulate the transmitted pulse, a frequency variation linearly varying in time is preferred, since with such a variation, the Doppler shifts produce on the pulse compression signal a substantially smaller effect than with a non-linear variation.

The envelope of the transmitted pulse is preferably rectangular, with an advantageous development providing cosinusoidally rounded leading and trailing edges.

Another object of the invention is to provide a radar system and radar method which reduces distance errors by producing asymmetric sidelobes around the main lobe, the leading lobe being reduced below a threshold and the trailing lobe being increased.

BRIEF DESCRIPTION OF THE DRAWINGS

In the Drawings:

FIG. 5 is a block diagram of the invention.

DESCRIPTION OF THE PREFERRED EMBODIMENT

The figures show, in a simplified way, the waveform of the weighting function ω(t) and the pulse compression signal PKS(t), referred to the standard time of a pulse width. First, for prior art pulse compression systems (FIGS. 1 and 2), and second, for an embodiment of the present invention (FIGS. 3 and 4), in both instances while assuming a rectangular transmitted pulse with a linear frequency modulation.

Figure 1:
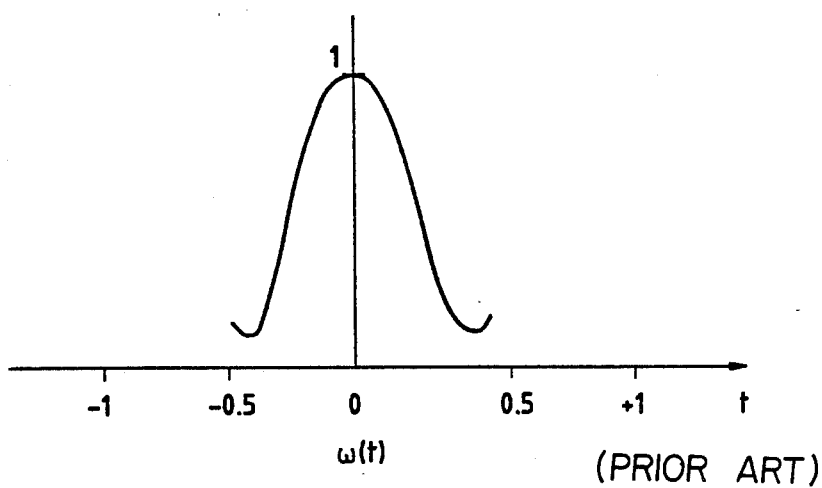
FIG. 1 is a graph showing a prior art weighting function which is applied to a radar signal for producing a pulse compression signal.

The filtering of a rectangular echo pulse in a compression filter having a symmetrical weighting function shown in FIG. 1, results in a pulse compression signal PKS. According to FIG. 2, with symmetric time sidelobes having amplitudes which exceed the amplitude threshold S, so that not the main lobe, but the sidelobes leading in time are used for determining the nearest target. That is, the first lobe encountered, which is above S, is used as the target signal rather than the main lobe.

Figure 3:
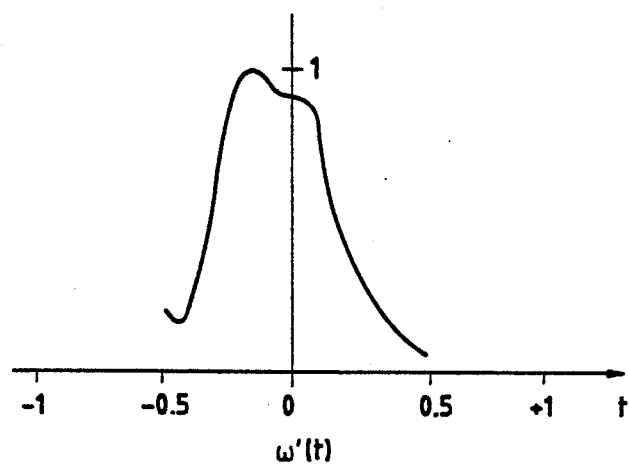
FIG. 3 is a weighting function used in accordance with the present invention.
Figure 4:
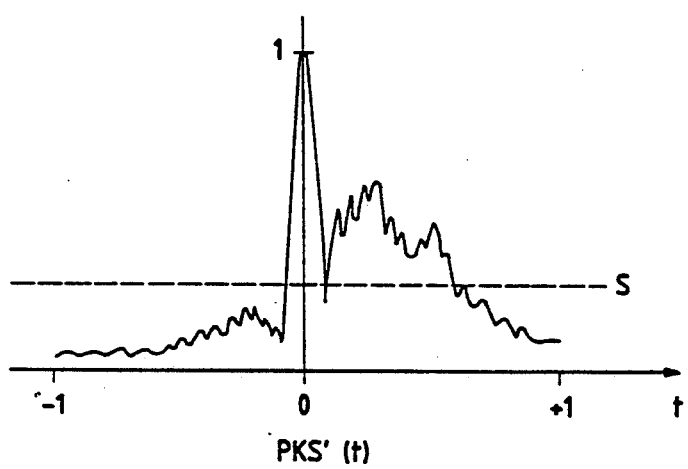
FIG. 4 is a graph showing the pulse compression signal obtained with the present invention.

The weighting function ω'(t) of a compression filter according to the example in FIG. 3 intentionally provides a pulse compression signal PKS' which is asymmetric in time, as shown in FIG. 4. Like the symmetric PKS, this PKS' also shows a narrow main lobe, but the sidelobes leading in time are strongly reduced and the energy proportion going for the sidelobes is predominantly shifted to the simultaneously raised lagging sidelobes. The leading sidelobes are clearly surmounted by the amplitude threshold S, so that it is the sharply beamed main lobe which is used to determine the nearest target. The relatively large amplitude of the lagging sidelobes does not disturb the determination of the nearest target.

Figure 2:
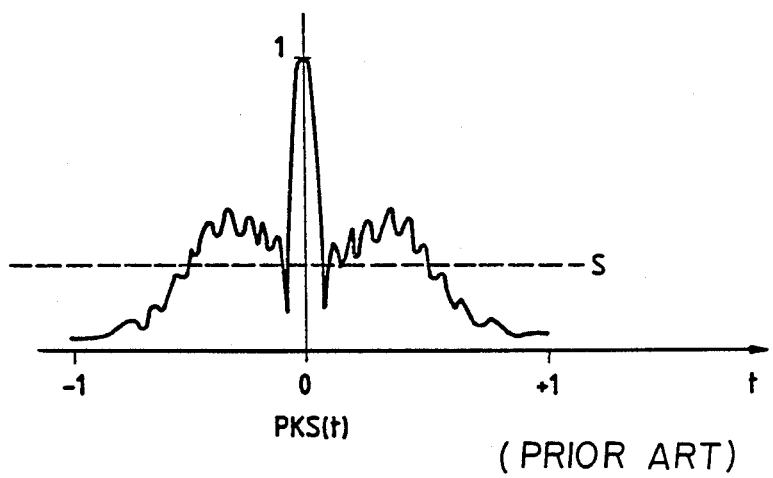
FIG. 2 is a graph showing a pulse compression signal of the prior art.

In FIG. 2, the left hand side lobe begins at t=−1. The main lobe is at t=0 and the right hand side lobe extends up to t=+1. The same is true of the pulse compressed signal according to the invention shown in FIG. 4. The weighting function shown in FIG. 3 is thus asymmetrical with respect to t=0 or the 0 time position for the main lobe of the PKS' signal to be formed.

FIG. 5 shows radar equpment 10 for transmitting frequency modulated pulses to a target and for receiving back echoed signals from the target. The echoed signals are then supplied to a compression filter 20 where the cross-correlation of the received signals is conducted. The received signals are assumed to have a zero time point corresponding to the main lobe of the signals. The comprssion filter 10 is selected to have an asymmetrical weighing function with respect to the zero time point so that the pulse compression signal PKS'(t) which is output from the filter 20 has a leading side lobe with respect to the zero time point which is reduced while the lagging side lobe with respect to the zero time point is raised as illustrated in FIG. 4.

The invention may be applied with particular advantage to ground tracking radars where still further advantages come to bear, in addition to those mentioned above, namely that with a pulse compression method, the peak power transmitted is substantially reduced, which also reduces the detectability by radar pickets. Due to the frequency modulation and the subsequent pulse compression, the radar resolution in the distance direction is reduced and at the same time the sensitivity to active disturbances is diminished.

Additional information concerning pulse compression techniques for radar can be found in an article entitled "A Pulse Compression Predistortion Function For Efficient Sidelobe Reduction In A High-Power Radar", by Cook et al. Proceedings of the IEEE, 52, 1964, pages 377 to 389; an article entitled "The Design And Applications Of Highly Dispersive Acoustic Surface-Wave Filters" by Gerard et al,IEEE Transactions On Sonics and Ultrasonics, Vol. SU-20, No. 2, April 1973, pages 94 to 104; and an article entitled "Sidelobe Suppression in a Range-Channel Pulse-Compression Radar" by Temes, IRE Transactions on Military Electronics, April 1962, pages 162 to 169. All of these references as well as the formerly identified references are incorporated here by reference.

While a specific embodiment of the invention has been shown and described in detail to illustrate the application of the principles of the invention, it will be understood that the invention may be embodied otherwise without departing from such principles. .

What is claimed is:

1. A radar system, particularly for ground tracking, comprising equipment for transmitting frequency modulated pulses and for receiving echo pulses having main lobes at a zero time point for each of the echo pulses, and a compression filter for compressing the echo pulses by cross-correlating the received echo pulses to a weighting function of the compression filter, the compression filter generating an asymmetrical weighting function with respect to the zero point for each echo pulse for producing the effect in the cross-correlated echo pulses that side lobes leading the zero point in time of the weighting function are reduced, while side lobes lagging the zero point in time are raised.

2. A radar system according to claim 1, wherein the compression filter is a surface wave filter.

3. A radar system according to claim 1, wherein the filter produces a linear frequency modulation of the transmitted pulses.

4. A radar system according to claim 1, wherein the transmitted pulse is rectangular.

5. A radar system according to claim 4, wherein edges of the transmitted pulse are cosinusoidally rounded.

6. A radar method, particularly for ground tracking, comprising transmitting frequency modulated pulses toward a target to produce echo pulses having main lobes at a zero time point for each echo pulse, compressing the echo pulses by cross-correlating received signals from the target with a weighting function of a compression filter, the weighting function being asymmetrical with respect to the zero point for each echo pulse for producing a main lobe at the zero point and leading and trailing side lobes with respect to the zero point, the leading side lobe being decreased below a threshold and the trailing side lobe being increased above the threshold.

7. A radar system, particularly for ground tracking, comprising equipment for transmitting frequency modulated pulses and for receiving echo pulses that can be cross-correlated with a weighting function in a compression filter having a center, to form pulse compression signals for each of the echo pulses, each of the pulse compression signals having main lobes at a zero time point for each of the signals, and a compression filter for compressing the echo pulses by cross-correlating the received echo pulses to a weighting function of the compression filter to form the pulse compression signals, the compression filter generating an asymmetrical weighting function with respect to the center of the filter for producing the effect in the pulse compression signals that side lobes leading the zero point in time are reduced, while side lobes lagging the zero point in time are raised.

8. A radar method, particularly for ground tracking, comprising transmitting frequency modulated pulses toward a target to produce echo pulses which are capable of being cross-correlated with a weighting function in a compression filter to form pulse compression signals each having main lobes at a zero time point for each of the signals, compressing the echo pulses by cross-correlating received signals from the target with a weighting function of a compression filter having a center, the weighting function being asymmetrical with respect to the filter center to produce pulse compression signals having main lobes at their zero time point and leading and lagging side lobes leading and lagging the zero point in time, the weighting function being asymmetrical to the extent that the leading side lobes are decreased below a threshold and the trail side lobes are increased above the threshold.

* * * * *